(12) United States Patent
Cheng et al.

(10) Patent No.: US 9,938,970 B2
(45) Date of Patent: Apr. 10, 2018

(54) BEST-FIT AFFINITY SENSORLESS CONVERSION MEANS OR TECHNIQUE FOR PUMP DIFFERENTIAL PRESSURE AND FLOW MONITORING

(71) Applicant: Fluid Handling LLC., Morton Grove, IL (US)

(72) Inventors: Andrew A. Cheng, Wilmette, IL (US); James J. Gu, Buffalo Grove, IL (US); Graham A. Scott, Prospect Heights, IL (US)

(73) Assignee: Fluid Handling LLC, Morton Grove, IL (US)

( * ) Notice: Subject to any disclaimer, the term of this patent is extended or adjusted under 35 U.S.C. 154(b) by 0 days.

(21) Appl. No.: 14/680,667

(22) Filed: Apr. 7, 2015

(65) Prior Publication Data

US 2016/0010639 A1    Jan. 14, 2016

Related U.S. Application Data

(60) Provisional application No. 61/976,749, filed on Apr. 8, 2014.

(51) Int. Cl.
*F04B 51/00* (2006.01)
*F04B 17/03* (2006.01)
(Continued)

(52) U.S. Cl.
CPC ............. *F04B 51/00* (2013.01); *F04B 17/03* (2013.01); *F04B 49/065* (2013.01);
(Continued)

(58) Field of Classification Search
CPC .................................................. F16K 37/0075
(Continued)

(56) References Cited

U.S. PATENT DOCUMENTS 5,069,792 A * 12/1991 Prince ..................... A61M 1/34
                                                                    210/637
5,507,629 A    4/1996 Jarvik
(Continued)

FOREIGN PATENT DOCUMENTS

DE    102007022348 A1    11/2008
EP        1323986 A1      7/2003
(Continued)

OTHER PUBLICATIONS

Prince, Paul et al., Adabptive Filter Concentrate Flow Control System and Method, PCT International Publication, WO86/02858, May 22, 1986, 42 pgs.*
(Continued)

*Primary Examiner* — Clayton E LaBalle
*Assistant Examiner* — Kevin Butler
(74) *Attorney, Agent, or Firm* — Ware, Fressola, Maguire & Barber LLP

(57) ABSTRACT

The present invention provides apparatus, including a hydronic sensorless pumping system, that features a signal processor or processing module configured to receive signaling containing information about motor readout values of power and speed, and also about pump and system characteristics equations together with empirical power equations that are constructed by a polynomial best-fit function together with pump affinity laws based upon a pump curve published by a pump manufacturer; and determine corresponding signaling containing information about a pump or system pressure and a flow rate at the motor readout values of power and speed, based upon the signaling received.

16 Claims, 4 Drawing Sheets

A hydronic sensorless pumping system.

(51) Int. Cl.
*F04B 49/06* (2006.01)
*F04B 49/10* (2006.01)
*F04D 15/00* (2006.01)
*F15B 19/00* (2006.01)
*F16K 37/00* (2006.01)
*G01L 5/00* (2006.01)

(52) U.S. Cl.
CPC .......... *F04B 49/103* (2013.01); *F04B 49/106* (2013.01); *F04D 15/0088* (2013.01); *F15B 19/00* (2013.01); *F16K 37/0075* (2013.01); *G01L 5/0061* (2013.01)

(58) Field of Classification Search
USPC .......................................................... 73/168
See application file for complete search history.

(56) References Cited

U.S. PATENT DOCUMENTS

| | | | |
|---|---|---|---|
| 5,743,846 A * | 4/1998 | Takahashi | G02B 23/2415 600/111 |
| 6,135,943 A | 10/2000 | Yu et al. | |
| 6,234,759 B1 * | 5/2001 | Hennel | F04B 49/20 417/44.1 |
| 6,260,004 B1 | 7/2001 | Hays et al. | |
| 6,481,973 B1 | 11/2002 | Struthers | |
| 6,532,423 B2 * | 3/2003 | Chen | F28F 27/00 257/E23.099 |
| 6,634,224 B1 | 10/2003 | Schob et al. | |
| 6,725,167 B2 * | 4/2004 | Grumstrup | G05D 7/0635 137/487.5 |
| 6,758,655 B2 * | 7/2004 | Sacher | G05D 7/0676 417/19 |
| 6,879,129 B2 | 4/2005 | Tazawa et al. | |
| 6,922,348 B2 * | 7/2005 | Nakajima | F04B 17/006 318/801 |
| 7,033,147 B2 * | 4/2006 | Yanai | A61M 1/101 417/22 |
| 7,117,120 B2 | 10/2006 | Beck et al. | |
| 7,143,016 B1 | 11/2006 | Discenzo et al. | |
| 7,558,699 B2 | 7/2009 | Beck et al. | |
| 7,591,777 B2 * | 9/2009 | LaRose | A61M 1/101 600/16 |
| 7,845,913 B2 | 12/2010 | Stiles, Jr. et al. | |
| 7,887,479 B2 | 2/2011 | LaRose et al. | |
| 7,945,411 B2 | 5/2011 | Kernan et al. | |
| 8,019,479 B2 * | 9/2011 | Stiles | F04D 15/0066 134/6 |
| 8,249,826 B1 | 8/2012 | Anderson et al. | |
| 8,282,359 B2 | 10/2012 | Ayre et al. | |
| 8,303,260 B2 | 11/2012 | Stavale et al. | |
| 8,417,360 B2 | 4/2013 | Sustaeta et al. | |
| 8,425,200 B2 | 4/2013 | Tran et al. | |
| 8,444,394 B2 * | 5/2013 | Koehl | F04D 15/0088 318/453 |
| 8,500,413 B2 | 8/2013 | Stiles, Jr. et al. | |
| 8,700,221 B2 * | 4/2014 | Cheng | F04D 15/0088 165/157 |
| 9,611,856 B2 * | 4/2017 | Cheng | F04D 15/0066 |
| 2003/0035730 A1 * | 2/2003 | Schob | A61M 1/101 417/53 |
| 2005/0025628 A1 * | 2/2005 | Jones | F04B 49/065 417/44.1 |
| 2005/0196293 A1 | 9/2005 | Ayre et al. | |
| 2006/0292012 A1 | 12/2006 | Brudevold et al. | |
| 2007/0065304 A1 * | 3/2007 | Meloche | F04B 43/0736 417/395 |
| 2007/0150113 A1 | 6/2007 | Wang et al. | |
| 2007/0154320 A1 * | 7/2007 | Stiles, Jr. | F04B 49/20 417/43 |
| 2007/0212210 A1 * | 9/2007 | Kernan | F04D 27/001 415/1 |
| 2007/0212229 A1 * | 9/2007 | Stavale | F04D 15/0088 417/42 |
| 2008/0288115 A1 | 11/2008 | Rusnak et al. | |
| 2009/0099700 A1 | 4/2009 | Taravat et al. | |
| 2010/0028171 A1 * | 2/2010 | Shulver | F01M 1/16 417/307 |
| 2010/0049480 A1 * | 2/2010 | Pekar | F24D 19/1015 703/2 |
| 2010/0130809 A1 * | 5/2010 | Morello | A61M 1/101 600/16 |
| 2010/0222632 A1 * | 9/2010 | Poirier | A61M 1/1086 600/16 |
| 2011/0076163 A1 | 3/2011 | Saukko | |
| 2011/0081255 A1 | 4/2011 | Steger et al. | |
| 2011/0200454 A1 | 8/2011 | Ahonen et al. | |
| 2012/0173027 A1 | 7/2012 | Cheng et al. | |
| 2013/0052038 A1 | 2/2013 | Ayre et al. | |
| 2014/0005841 A1 * | 1/2014 | Cheng | G05D 7/0617 700/282 |
| 2014/0135999 A1 * | 5/2014 | Stavale | G01F 25/0007 700/282 |
| 2014/0249682 A1 * | 9/2014 | Cheng | F04D 27/001 700/282 |
| 2014/0288716 A1 * | 9/2014 | Cheng | F04D 15/0066 700/282 |
| 2015/0032271 A1 * | 1/2015 | Cheng | F04B 49/065 700/282 |
| 2016/0010639 A1 * | 1/2016 | Cheng | F04B 51/00 73/168 |
| 2016/0017889 A1 * | 1/2016 | Cheng | F04D 15/0072 700/277 |
| 2016/0041026 A1 * | 2/2016 | Stavale | G01F 25/0007 702/100 |
| 2016/0186889 A1 * | 6/2016 | Cheng | G01F 15/005 137/12 |
| 2016/0237944 A1 * | 8/2016 | Adelman | F02D 41/3082 |
| 2016/0246290 A1 * | 8/2016 | Cheng | G05B 19/4155 |

FOREIGN PATENT DOCUMENTS

| | | | | |
|---|---|---|---|---|
| EP | 1761306 | * | 3/2007 | ............. A61M 1/10 |
| WO | WO2005115539 | * | 12/2005 | ............. A61N 1/362 |
| WO | 2013090907 A1 | | 6/2013 | |
| WO | 2014044287 | | 3/2014 | |
| WO | WO2015157276 | * | 4/2014 | ............. G01F 9/00 |

OTHER PUBLICATIONS

La Rose, Jeffrey, Sensorless Flow Estimation for Implanted Ventricle Assist Device, PCT International Publication, WO2005/115539, Dec. 8, 2005, 29 Pages.*
International Search Authority Written Opinion, PCT/US2014/017972, dated Jun. 20, 2014, 6 pages.*
International Search Authority Search Report, PCT/US2014/017972, dated Jun. 20, 2014, 2 pages.*
International Search Authority Written Opinion, PCT/US2015/024703, dated Aug. 20, 2015, 5 pages.*
International Search Authority Search Report, PCT/US2015/024703, dated Aug. 20, 2015, 2 pages.*
Harihara, Parasuram P., and Alexander G. Parlos. "Sensorless detection of cavitation in centrifugal pumps." ASME 2006 International Mechanical Engineering Congress and Exposition. American Society of Mechanical Engineers, 2006. http://parlos.tamu.edu/Conference/IMECE_2006.pdf (pp. 1-6)
Bakman, Ilja. "Implementation and testing the sensorless pressure measurement of centrifugal pumps." 13th International Symposium, Topical Problems in the Field of Electrical and Power Engineering, Doctoral School of Energy and Geotechnology II, Paernu, Estonia, 2013. http://egdk.ttu.ee/files/parnu2013/Parnu_2013_132-138.pdf (pp. 132-138)
Ahonen, Tero, et al. "Sensorless frequency-converter-based methods for realizing life-cycle cost efficient pumping and fan systems." http://www.eemods2013.org/paper/Oct28/Session%201.c/Papers/071_Ahonen_finalpaper_EEMODS13.pdf (pp. 1-12).
Ahonen, Tero, et al. "Estimation of pump operational state with model-based methods." Energy Conversion and Management 51.6, 2010, 1319-1325. http://www.sciencedirect.com/science/article/pii/S0196890410000208 (2pgs).

(56) References Cited

OTHER PUBLICATIONS

Chang, C. L., et al. "Fuel sensor-less control of a liquid feed fuel cell system under steady load for portable applications." Journal of power sources 164.2, 2007, 606-613. http://www.sciencedirect.com/science/article/pii/S0378775306022464 (1pg).
English language Abstract of DE102007022348.
English language Abstract of EP1323986.

* cited by examiner

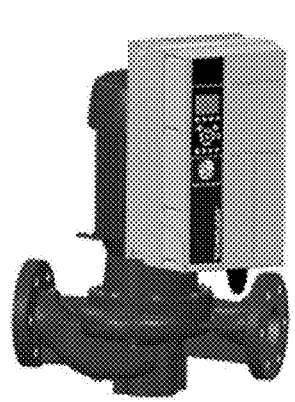
Figure 1. A hydronic sensorless pumping system.
Figure 2. Sensorless conversion for pump pressure and flow rate from motor power and speed.

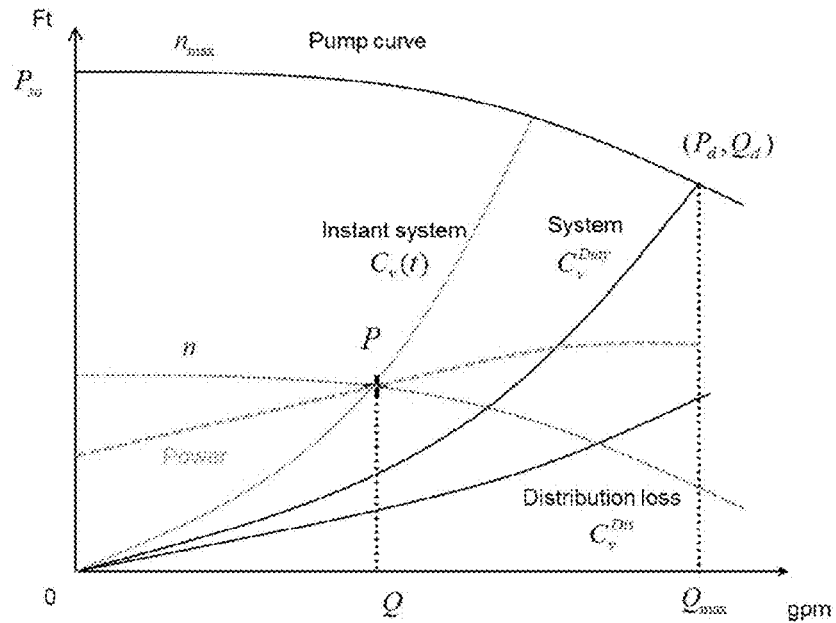
Figure 3. Pump, system and power characteristics curves and the pressure equilibrium point at a steady state.
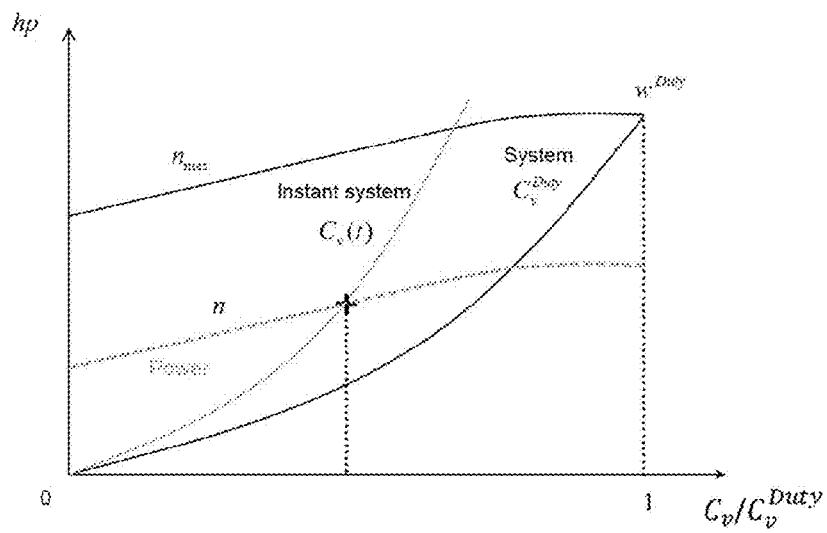
Fig. 4 Motor power and system characteristics.

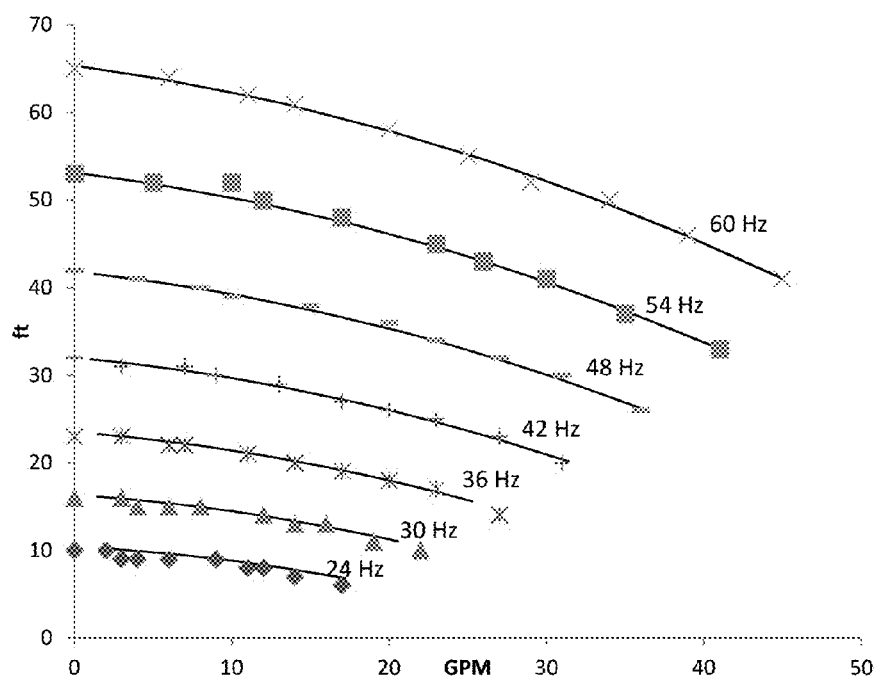
Fig 5. Pump differential pressure vs. system flow rate from the sensorless converter (solid lines) and the measured data from sensors (symbols).

Apparatus 10, including a hydronic sensorless pumping system,

Signal processor or processing module 10a configured at least to:

receive signaling containing information about motor readout values of power and speed, and also about pump and system characteristics equations together with empirical power equations that are constructed by a polynomial best-fit function together with pump affinity laws based upon a pump curve published by a pump manufacturer; and determine corresponding signaling containing information about a pump or system pressure and a flow rate at the motor readout values of power and speed, based upon the signaling received; and/or provide the corresponding signaling containing information about the pump or system pressure and a flow rate determined, e.g., for controlling a hydronic pumping system.

Other signal processor circuits or components 10b that do not form part of the underlying invention, e.g., including input/output modules, one or more memory modules, data, address and control busing architecture, etc.

Figure 6

BEST-FIT AFFINITY SENSORLESS CONVERSION MEANS OR TECHNIQUE FOR PUMP DIFFERENTIAL PRESSURE AND FLOW MONITORING

CROSS REFERENCE TO RELATED APPLICATION

This application claims benefit to U.S. provisional application No. 61/976,749, filed 8 Apr. 2014, entitled "A Best-fit affinity sensorless conversion means for pump differential pressure and flow monitoring," which is hereby incorporated by reference in its entirety.

This application is also related to a family of technologies developed by one or more of the inventors and disclosed in the following applications:

1) U.S. application Ser. No. 12/982,286, filed 30 Dec. 2010, entitled "Method and apparatus for pump control using varying equivalent system characteristic curve, AKA an adaptive control curve," which issued as U.S. Pat. No. 8,700,221 on 15 Apr. 2014;
2) U.S. application Ser. No. 13/717,086, filed 17 Dec. 2012, entitled "Dynamic linear control methods and apparatus for variable speed pump control," which claims benefit to U.S. provisional application No. 61/576,737, filed 16 Dec. 2011;
3) U.S. application Ser. No. 14/091,795, filed 27 Nov. 2013, entitled "3D sensorless conversion method and apparatus," which claims benefit to U.S. provisional application No. 61/771,375, filed 1 Mar. 2013;
4) U.S. application Ser. No. 14/187,817, filed 24 Feb. 2014, entitled "A Mixed Theoretical And Discrete Sensorless Converter For Pump Differential Pressure And Flow Monitoring," which claims benefit to U.S. provisional application No. 61/803,258, filed 19 Mar. 2013;
5) U.S. application Ser. No. 14/339,594, filed 24 Jul. 2014, entitled "A Best-fit and Affinity. Sensorless Converter for Pump Differential Pressure and Flow Monitoring," which claims benefit to U.S. provisional application Ser. No. 61/976,749, filed 8 Apr. 2014; and
6) U.S. provisional application Ser. No. 62/007,474, filed 4 Jun. 2014, entitled "System and Flow Adaptive Pumping Control Apparatus—A Minimum Pumping Energy Operation Control System vs. Sensorless Application;"

which are all assigned to the assignee of the instant patent application, and all incorporated by reference in their entirety.

The present invention builds on the family of technologies disclosed in the aforementioned related applications.

BACKGROUND OF THE INVENTION

1. Field of the Invention

The present invention relates to a technique for controlling the operation of a pump; and more particularly, the present invention relates to a method and apparatus for controlling and/or monitoring a pump, e.g., including for domestic and commercial heating or cooling water systems.

2. Brief Description of Related Art

INTRODUCTION

Hydronic pumping system sensorless control and monitoring techniques are known in the art, e.g., including a 3D discrete and a mixed theoretical and 3D discrete sensorless conversion methods, consistent with that disclosed in the aforementioned related patent application identified as reference nos. 3-5. The system pressure and flow rate may be resolved directly from a pair of motor readout values with a conversion error around 5-15% by the 3D discrete sensorless converter, e.g., based upon pump calibration data in the aforementioned reference no. 4. The mixed theoretical and discrete sensorless converter disclosed in the aforementioned reference no. 3, on the other hand, yields a conversion error around 10-20% without a need of instrumentation calibration, even though a power distribution data with respect to system coefficient and motor speed is still needed to convert the system coefficient on a varying hydronic system.

Pump sensorless data calibration, including the instrumentation and data acquisition process, is an interesting discussion topic on pump sensorless applications, which may not be easy achievable at all due to the lack of pressure and flow sensors for most pumping applications scenarios. In fact, it may be quite time consuming and tedious as well to collect the calibration data for a sensorless pump and motor combination product even to do it in manufacturing assembly lines, not to mention using expensive data acquisition instrumentations as well as hydronic pumping testing systems setups. Therefore, the inventors of this application recognize and appreciate that a sensorless means or technique with no need or less need on the calibration data may be more favorable for most sensorless pump control applications.

For a dynamic hydronic system with its flow rate regulated by valves or regulators, the equivalent hydronic system characteristics coefficient is an unknown variable in general dependent on the valves open position and system dynamic friction loss as well. The pump efficiency under such a varying hydronic system is a changing variable due to motor speed slip under the varying hydronic load as well as some pump mechanical friction induced thermal consumption effects, especially at low speed with system nearly shut off. Therefore, the inventors of this application also recognize and appreciate that it is a quite challenge job to formulate any theoretic expressions for the reconstruction of a pump sensorless converter which yields the system pressure and flow directly from motor readout values, such as power, current, torque, speed, and so on so forth.

SUMMARY OF THE INVENTION

In summary, the present invention provides a new and unique best-fit affinity sensorless conversion means or technique for deriving pump or system pressure and flow rate at a given pair of motor readout values of power and speed, e.g., based upon using pump and system characteristics equations together with an empirical power equation. The pump characteristics equation and the empirical power equation may be reconstructed by a polynomial best-fit function together with the pump affinity laws or its modified version, e.g., based upon the pump curve published by pump manufacturers. System pressures and flow rate may be, therefore, resolved at the stead state equilibrium point of pump and system pressures by the pump and system characteristics equations as well as the empirical power equation accordingly. The sensorless model and technique disclosed herein is much easier to be applied for most practical hydronic pumping sensorless control and monitoring applications with quite satisfactory accuracy without a need of the instrumentation calibration.

The instant application provides a technique that is a further development of, and builds on, the aforementioned family of technologies set forth above.

Particular Embodiments

According to some embodiments, the present invention may include, or take the form of, apparatus featuring a signal processor or processing module configured at least to:
receive signaling containing information about motor readout values of power and speed, and also about pump and system characteristics equations together with empirical power equations that are constructed by a polynomial best-fit function together with pump affinity laws based upon a pump curve published by a pump manufacturer; and
determine corresponding signaling containing information about a pump or system pressure and a flow rate at the motor readout values of power and speed, based upon the signaling received.

In operation, the signal processor or processing module may be configured to resolve pump differential pressures and flow rate at an equilibrium point of the pump or system pressure at a motor steady state condition.

In operation, the signal processor or processing module 10a may also be configured to provide corresponding signaling containing information about the pump or system pressure and the flow rate, including for pump differential pressure and flow monitoring. The corresponding signaling may be used to control a hydronic pumping system.

Embodiments are also envisioned in which the apparatus includes, or takes the form of, the hydronic pumping system, e.g., having such a signal processor or processing module.

The signaling received may be sensed and received from suitable sensors configured to measure motor readout values of power and speed.

The signaling received may be stored and received from suitable memory modules, e.g., configured with pump and system characteristics equations together with empirical power equations that are constructed by a polynomial best-fit function together with pump affinity laws based upon a pump curve published by a pump manufacturer.

By way of example, the signal processor or processing module may include, or take the form of, at least one processor and at least one memory including computer program code, and the at least one memory and computer program code are configured to, with at least one processor, to cause the signal processor or processing module at least to receive the signaling (or, for example, associated signaling) and determine the adaptive pressure set point. The signal processor or processing module may be configured to suitable computer program code in order to implement suitable signal processing algorithms and/or functionality, consistent with that set forth herein.

The apparatus may include, or take the form of, a pump control or controller, including a PID control, having the signal processor or signal processor module, e.g., including for monitoring pump differential pressure and flow.

According to some embodiments, the present invention may take the form of a method including steps for: receiving in a signal processor or processing module signaling containing information about motor readout values of power and speed, and also about pump and system characteristics equations together with empirical power equations that are constructed by a polynomial best-fit function together with pump affinity laws based upon a pump curve published by a pump manufacturer; and determining in the signal processor or processing module corresponding signaling containing information about a pump or system pressure and a flow rate at the motor readout values of power and speed, based upon the signaling received.

The method may also include one or more of the features set forth herein, including providing from the signal processor or processing module corresponding signaling containing information about the pump or system pressure and the flow rate, e.g., which may be used to control a hydronic pumping system.

The present invention may also, e.g., take the form of a computer program product having a computer readable medium with a computer executable code embedded therein for implementing the method, e.g., when run on a signaling processing device that forms part of such a pump controller. By way of example, the computer program product may, e.g., take the form of a CD, a floppy disk, a memory stick, a memory card, as well as other types or kind of memory devices that may store such a computer executable code on such a computer readable medium either now known or later developed in the future.

In conclusion, the embodiments disclosed herein provides best-fit affinity sensorless conversion means or techniques for deriving pump or system pressure and flow rate at a given pair of motor readout values of power and speed, e.g., based upon using pump and system characteristics equations together with empirical power equations. The pump characteristics equation and the empirical power equation may be constructed by the polynomial best-fit function together with the pump affinity laws based upon the pump curve published by pump manufacturers, e.g., that may be stored in suitable memory module and processed accordingly. Pump differential pressures and flow rate may be resolved at the equilibrium point of pump and system pressures at the motor steady state accordingly. The pump sensorless conversion means or technique disclosed herein may be much easier to be applied for most practical hydronic pumping control and monitoring applications with satisfactory accuracy.

BRIEF DESCRIPTION OF THE DRAWING

The drawing includes the following Figures, which are not necessarily drawn to scale:

FIG. 1 is a schematic diagram of a hydronic sensorless pumping control system that is known in the art, e.g., in which the present invention may be implemented, according to some embodiment.

FIG. 2 is a schematic diagram of sensorless conversion for pump pressure and flow rate from sensed power and speed.

FIG. 3 is a graph of pressure (Ft) in relation to flow (GPM) showing pump, system and power characteristics curves and a pressure equilibrium point at a steady state, according to implementation of some embodiments of the present invention.

FIG. 4 is a graph of power (hp) in relation to system characteristics $(C_V/C_V^{Duty})$ flow (GPM) showing motor power and system characteristics, according to implementation of some embodiments of the present invention.

FIG. 5 is a graph of pressure (Ft) with respect to flow (GPM) showing pump differential pressure versus system flow rate from the sensorless converter (see solid lines) and the measured or sensed data from sensors (see symbols (e.g., diamonds, triangles, stars, plus signs, minus signs, boxes, and "x"s) at various speeds, including 24 Hz, 30 Hz, 36 Hz, 42 Hz, 48 Hz, 54 Hz and 60 Hz.

FIG. 6 is a block diagram of apparatus, e.g., having a signal processor or processing module configured for implementing the signal processing functionality, according to some embodiments of the present invention.

DETAILED DESCRIPTION OF THE INVENTION

FIG. 1 shows a hydronic sensorless pumping control system having a combination of a centrifugal pump connected to piping with a flow and a controller, e.g., in which the present invention may be implemented. The sensorless conversion for pump differential pressure and flow rate associated with the equivalent hydronic system characteristics coefficient variable at the discharge of a pump and the motor power and speed at the other end of a motor drive is shown schematically in FIG. 2. Pump, system and power characteristics curves as well as the corresponding pressure equilibrium point of pump and system pressures at a steady state for a close loop system with a static suction pressure are presented schematically in FIG. 3.

Considering a close loop system with a static suction pressure, the system flow rate and pressure at a motor speed and a system position may be resolved at the steady state equilibrium point of pump and system pressures which is the intersection of the pump and system curves functions shown schematically in FIG. 3. Here, the instant pump characteristic curve, which is the pump differential pressure P with respect to flow rate Q and motor speed of n, may be represented approximately in a polynomial form of $P=f(Q,n)$ based upon the pump curve at motor full speed $n_{max}$ as well as the pump affinity law. The system flow rate may, therefore, be resolved by the pump differential pressure function of $P=f(Q,n)$ together with the system flow equation of $C_v=Q/\sqrt{P}$ subsequently. The pump affinity laws cited here denotes the equations for pump flow, differential pressure and motor power, i.e., $Q/Q_{max}=n/n_{max}$, $P/P_{max}=(n/n_{max})^2$ and, $w/w_{max}=(n/n_{max})^3$, respectively.

Following the approach described above by, e.g., using a second order best-fit affinity pump curve function together with system flow equation specifically, for instance, the system flow rate may be derived using Equation (1) as:

$$Q(n, C_v) = \frac{n}{2n_{max}} \left(-b \pm \sqrt{b^2 - 4c(a - C_v^{-2})}\right) / (a - C_v^{-2}), \quad (1)$$

where $C_v$ is the system coefficient, and a, b and c are the coefficients of a second order best-fit pump curve function at motor full speed of $n_{max}$. The pump differential pressure function of $P=f(Q,n)$ used here may be in form of Equation (2) as:

$$P(n,Q) = (aQ^2 + b(n/n_{max})^1 Q + (n/n_{max})^2 c). \quad (2)$$

Noted that other expressions of system flow rate and pump differential equations may be derived as well if other kinds of curve fitting or interpolating approaches may be chosen, for instance, a third order polynomial form of fitting or interpolating may be instead of that set forth herein.

To resolve the system flow rate and pressure at a steady pressure equilibrium point from a given pair of motor power and speed by Eqs. 1 and 2, the corresponding dynamic system characteristic coefficient should typically be known first. For a varying hydronic system with flow regulated by valves or other flow regulators, however, there is no simple close form solution on that. As disclosed herein, an empirical power and system characteristics relation based on the power curve at motor full speed $n_{max}$ as well as the affinity law may be used, which is schematically shown in FIG. 4. Here, the motor power function at maximum speed with respect to the system coefficient may be reconstructed first by using a fitting or interpolating technique. The motor power at a given motor speed of, e.g., $w=w(C_v,n)$, may then be formulated by utilizing pump affinity laws accordingly.

By using a second order best-fit affinity power function following the approach described above specifically, for instance, the system coefficient $C_v$ may be expressed explicitly in form of Equation (3) as:

$$C_v^{norm}(w, n) = -\frac{B}{2A} \pm \sqrt{\frac{w\left(\frac{n_{max}}{n}\right)^3 - \left(C - \frac{B^2}{4A}\right)}{A}}, \quad (3)$$

where w is motor power at a speed of n, A, B and C are the coefficients of the second order best-fit motor power function at motor maximum speed with respect to the normalized system coefficient of $C_v^{norm}$. The motor power function at any instant speed, $w=w(C_v,n)$, may be expressed in form of Equation (4) as:

$$w(C_v, n) = \left(\frac{n}{n_{max}}\right)^3 \left(A\left(C_v^{norm} + \frac{B}{2A}\right)^2 + \left(C - \frac{B^2}{4A}\right)\right). \quad (4)$$

In case if there may be any accuracy requirement at low speed region and with system nearly shut down, the pump power affinity law may not be sufficient to represent the relation of motor power and speed well due to motor speed slip in that region. Slightly larger power value at low speed region results in a little larger the system coefficient value from the power inversion by Eq. 3, so a little larger flow rate from Eq. 1 as well consequently. A modified affinity law for motor power and speed representation may, therefore, be needed and Eq. 4 may be rewritten in the form of Equation (5) as:

$$w(C_v, n) = f^*(n)\left(A\left(C_v^{norm} + \frac{B}{2A}\right)^2 + \left(C - \frac{B^2}{4A}\right)\right), \quad (5)$$

where $f^*(n)$ is the modified affinity law in form of the third order polynomial approximation in the form of Equation (6) as:

$$f^*(n) = (A'(n/n_{max})^3 + B'(n/n_{max})^2 + C'(n/n_{max})^1 + D'), \quad (6)$$

where A', B' C' and D' are the coefficients of the third order best-fit power function of the power values normalized at maximum speed with respect to the normalized motor speed of $n/n_{max}$. Instead of the pump power affinity law of $w/w_{max}=(n/n_{max})^3$, the modified affinity law is the third order polynomial approximation for representing power and speed relation, which is obtained through fitting or interpolating with an array of power values measured at a set of given speeds at a system position. The system position can be anywhere from shut off to fully open, since the normalized power distribution of $f^*(n)$ is nearly identical at any system position. Similarly, and by way of further example, Equations nos. 3-6 may be presented in some other expressions as well if other kinds of curve fitting or interpolating approaches are used alternatively.

The system flow rate and pressure at the equilibrium point of pump and system pressure at a steady state motor speed associated with its corresponding power consumption can, therefore, be obtained by Equations 1 and 2, as far as the system coefficient of $C_v$ is obtained by use of Equations 3 and 4 or 5 accordingly, which may be called the so-called best-fit affinity sensorless converter in this disclosure. By using the best-fit affinity sensorless converter, the pressure and flow rate values may be collected from a pumping system and compared with the data measured from sensors. The results shown in FIG. 5 demonstrates quite satisfactory accuracy mostly around 5-10% error at whole speed regions from 30 up to 60 Hz in pump normal working hydronic region and around 10-20% error at low speed region and when system is nearly shut off in general.

The best-fit affinity sensorless converter disclosed herein may be used for most practical hydronic pumping control and monitoring applications, since it is formulated from pump, power characteristics equations as well as affinity law and reconstructed by polynomial best-fit based on the pump data published by pump manufacturers. The converter is much easier to be set up while maintaining satisfactory accuracy. Most importantly above all, there may be no need for tedious and time consuming instrumentation calibration process, as long as manufacturers published data or curves are available.

FIG. 6

By way of example, FIG. 6 shows apparatus 10 according to some embodiments of the present invention, e.g., featuring a signal processor or processing module 10a configured at least to:
receive signaling containing information about motor readout values of power and speed, and also about pump and system characteristics equations together with empirical power equations that are constructed by a polynomial best-fit function together with pump affinity laws based upon a pump curve published by a pump manufacturer; and
determine corresponding signaling containing information about a pump or system pressure and a flow rate at the motor readout values of power and speed, based upon the signaling received.

In operation, the signal processor or processing module may be configured to resolve pump differential pressures and flow rate at an equilibrium point of the pump or system pressure at a motor steady state condition.

In operation, the signal processor or processing module 10a may also be configured to provide corresponding signaling containing information about the pump or system pressure and the flow rate, including for pump differential pressure and flow monitoring. The corresponding signaling may be used to control a hydronic pumping system.

As a person skilled in the art would appreciate and understand, the present invention may be implemented using pump and system characteristics equations and empirical power equations, e.g., consistent with that set forth herein, as well as by using other types or kinds of pump and system characteristics equations and empirical power equations that are either now known or later developed in the future.

As a person skilled in the art would appreciate and understand, the present invention may be implemented using pump curves published by pump manufacturers, e.g., consistent with that set forth herein that are known in the art for pumps that are also known in the art at the time of the present invention. However, embodiments are envisioned, and the scope of the invention is intended to include, using other types or kinds of pump curves published by pump manufacturers for pumps that are later developed after the time of the present invention.

By way of example, the functionality of the apparatus 10 may be implemented using hardware, software, firmware, or a combination thereof. In a typical software implementation, the apparatus 10 would include one or more microprocessor-based architectures having, e.g., at least one signal processor or microprocessor like element 10a. A person skilled in the art would be able to program such a microcontroller-based, or microprocessor-based, implementation to perform the functionality described herein without undue experimentation. For example, the signal processor or processing module 10a may be configured, e.g., by a person skilled in the art without undue experimentation, to receive the signaling containing information about the motor readout values of power and speed, and also about the pump and system characteristics equations together with the empirical power equations that are constructed by the polynomial best-fit function together with the pump affinity laws based upon the pump curve published by the pump manufacturer, consistent with that disclosed herein. By way of example, the information about the motor readout values of power and speed may be included in sensed signaling received, processed and/or stored, e.g., in a suitable memory module that forms part of such a microprocessor-based architecture. Similarly, by way of example, the information about the pump and system characteristics equations together with the empirical power equations that are constructed by the polynomial best-fit function together with the pump affinity laws based upon the pump curve published by the pump manufacturer may be received, processed and/or stored, in a suitable memory module that forms part of such a microprocessor-based architectures.

Moreover, the signal processor or processing module 10a may be configured, e.g., by a person skilled in the art without undue experimentation, to determine the corresponding signaling containing information about a pump or system pressure and a flow rate at the motor readout values of power and speed, based upon the signaling received, consistent with that disclosed herein.

The scope of the invention is not intended to be limited to any particular implementation using technology either now known or later developed in the future. The scope of the invention is intended to include implementing the functionality of the processors 10a as stand-alone processor or processor module, as separate processor or processor modules, as well as some combination thereof.

The apparatus 10 may also include, e.g., other signal processor circuits or components 10b, including random access memory or memory module (RAM) and/or read only memory (ROM), input/output devices and control, and data and address buses connecting the same, and/or at least one input processor and at least one output processor.

Various Points of Novelty

The present invention may include, or take the form of, one or more of the following various embodiments:

For example, according to some embodiments the present invention may take the form of, or may be implemented as, a best-fit affinity sensorless conversion means or technique for pump differential pressure and flow, e.g., that may include a pump sensorless converter which yields the pump differential pressure and system flow rate associated with a dynamic system with respect to motor speed and power readout signals based on the pump and system characteristics curves equations together with the empirical power equations represented as P=f(Q,n), P=(Q/C$_v$)$^2$ and W=w(C$_v$, n), e.g., as schematically plotted in FIG. 3.

According to some embodiments, the present invention may be implemented using one preferred version of the best-fit affinity sensorless conversion means or technique for pump differential pressure and flow mentioned above, e.g., may include a solution of pump differential pressure, or system pressure, and flow rate at the steady state equilibrium point of the pump differential pressure and system pressure, which is the intersection of the pump and system curves schematically shown.

According to some embodiments, the present invention may be implemented using the pump curves equations in the best-fit affinity sensorless conversion means or technique mentioned above, e.g., that may include pump curve models which are developed based upon the pump characteristics equations at a motor speed and system flow rate. The pump curve models mentioned here may be expressed approximately by function of P=f(Q,n) based upon the pump hydronic characteristic curve at full speed (or pump curve) and pump affinity law. For a reasonably good representation with high accuracy, the best-fit approach may be used to formulate the pump curve function of P=(Q,n). For instance, a second order best-fit affinity polynomial function of $$P(n, Q) = \left(\frac{n}{n_{max}}\right)^2 \left(a\left(\frac{n_{max}}{n}\right)^2 Q^2 + b\left(\frac{n_{max}}{n}\right)^1 Q + c\right)$$

may be used for representing a pump curve at a speed of n. For a pump characteristics curve with a little complicated curve shape, however, a higher order polynomial expression may be used to better represent pump curve, if achievable. Some other expressions may be obtained as well if other kinds of curve fitting or interpolating approaches are used alternatively. Curve fitting or interpolating approaches are known in the art, and the scope of the invention is not intended to be limited to any particular type or kind thereof either now known or later developed in the future.

According to some embodiments, the present invention may be implemented using the equivalent hydronic system characteristics curve equation in the best-fit affinity sensorless conversion means or technique mentioned above, e.g., that may include the flow equation of $C_v=Q/\sqrt{P}$, or some of its alternative expressions or approximations, to represent the system characteristics curve.

According to some embodiments, the present invention may be implemented using the steady state pressure equilibrium point in the best-fit affinity sensorless conversion means or technique mentioned above, that may include the intersection point of the pump and system curves functions, as shown in FIG. 3. The system pressure or pump differential pressure and flow rate may be solved at the pressures equilibrium point for a pair of motor readout values given, for instance, speed and power, as the sensorless output values converted. For instance, for a second order best-fit affinity pump curve approximation, the aforementioned Eqs. 1 and 2 presented as $$Q(n, C_v) = \frac{\frac{n}{2n_{max}}\left(-b \pm \sqrt{b^2 - 4c(a - C_v^{-2})}\right)}{a - C_v^{-2}} \quad (1)$$

and $$P(n, Q) = \left(\frac{n}{n_{max}}\right)^2 \left(a\left(\frac{n_{max}}{n}\right)^2 Q^2 + b\left(\frac{n_{max}}{n}\right)^1 Q + c\right) \quad (2)$$

may be the system flow rate and pressure expressions derived for the sensorless converter at a pair of motor speed and power given, respectively. The equations for converting the system pressure and flow rate may be written in some other forms as well by following the stead state pressure equilibrium point approach, however, in case that the higher order fitting or interpolating functions or some other forms of functions are used, if desirable.

According to some embodiments, the present invention may be implemented using the empirical power function to resolve the equivalent system characteristics coefficient with respect to motor power and speed in the best-fit affinity sensorless conversion means or technique mentioned above, e.g., that may include the empirical power function of w(C$_v$,n) with respect to motor speed and system flow rate. The power curve models mentioned here may be expressed approximately by function of w(C$_v$,n) based upon the power curve at full speed, exactly corresponded to the pump curve, and affinity law. For a reasonably good representation with high accuracy, similarly, the best-fit affinity approach may be used to formulate the power curve function of f w(C$_v$,n). For instance, a second order best-fit affinity polynomial function of Eq. 4, $$w(C_v, n) = \left(\frac{n}{n_{max}}\right)^3 \left(A\left(C_v^{norm} + \frac{B}{2A}\right)^2 + \left(C - \frac{B^2}{4A}\right)\right), \quad (4)$$

$$P = P_{so}\left(\frac{n}{n_{max}}\right)^2 + \frac{P_d \cdot P_{so}}{Q_d^2} Q$$

may be used for representing a power curve function in term of motor speed of n and the normalized equivalent system characteristics coefficient of $C_v^{norm}$, based upon the corresponding power curve associated with the pump curve at maximum speed, schematically plotted in FIG. 4. A higher polynomial expression or other form expressions may be introduced as well for better representing power curve functions, if needed.

According to some embodiments, the present invention may be implemented using one preferred version of the empirical power function in the best-fit affinity sensorless conversion means for pump differential pressure and flow mentioned above, e.g., that may include a best-fit affinity polynomial function of the Equation (4):

$$w(C_v, n) = f^*(n)\left(A\left(C_v^{norm} + \frac{B}{2A}\right)^2 + \left(C - \frac{B^2}{4A}\right)\right) \quad (4)$$

with the modified power affinity law of f*(n) in form of the third order polynomial expression of Equation (6) as:

$$f^*(n) = (A'(n/n_{max})^3 + B'(n/n_{max})^2 + C'(n/n_{max})^1 + D'). \quad (6)$$

The modified power affinity law of f*(n) is obtained by fitting an array of power values normalized at its corresponding maximum value at full speed with a set of given speeds at a given system position, which may be used to compensate the power variation at low speed region with system shut down.

According to some embodiments, the present invention may be implemented using the system characteristics coefficient conversion in the best-fit affinity sensorless conversion means or technique, e.g., that may include all forms of expressions either a close form solution or a solution using some discrete numerical methods. For example, Equation 3 of $$C_v^{norm}(w, n) = -\frac{B}{2A} \pm \sqrt{\frac{w\left(\frac{n_{max}}{n}\right)^3 - \left(C - \frac{B^2}{4A}\right)}{A}} \quad (3)$$

may be close form solutions derived inversely for the equivalent system characteristics coefficient expression by using empirical power function of Eq. 4.

According to some embodiments, the present invention may be implemented using the hydronic pumping system in the best-fit affinity sensorless conversion means or technique, e.g., that may include all close loop or open loop hydronic pumping systems, such as primary pumping systems, secondary pumping systems, water circulating systems, and pressure booster systems. The systems mentioned here may consist of a single zone or multiple zones as well.

According to some embodiments, the present invention may be implemented using the pump and power curves data at motor maximum speed in the best-fit affinity sensorless conversion means or technique, e.g., that may include the pump and power curves data published by pump manufacturers or a few points of pump data acquired at motor full speed in field. Here, the motor power curve data may also be replaced by any potential motor electrical or mechanical readout signals, such as motor current or torque, and so forth.

According to some embodiments, the present invention may be implemented using the hydronic signals for in the best-fit affinity sensorless conversion means or technique, e.g., that may include pump differential pressure, system pressure or zone pressure, system or zone flow rate, and so forth.

According to some embodiments, the present invention may be implemented using control signals transmitting and wiring technologies, e.g., that may include all conventional sensing and transmitting means that are used currently. Preferably, wireless sensor signal transmission technologies would be optimal and favorable.

According to some embodiments, the present invention may be implemented using the pumps mentioned above for the hydronic pumping systems, e.g., that may include a single pump, a circulator, a group of parallel ganged pumps or circulators, a group of serial ganged pumps or circulators, or their combinations.

According to some embodiments, the present invention may be implemented using systems flow regulation, e.g., that may include manual or automatic control valves, manual or automatic control circulators, or their combinations.

The aforementioned implementations are provided by way of example, and the scope of the invention is intended to include other types or kinds of implementations consistent with that disclosed herein within the spirit of the present invention.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. Apparatus for pump differential pressure and flow monitoring, comprising:
   a signal processor or processing module configured at least to:
      receive signaling containing information about motor readout values of power and speed, and also about pump and system characteristics equations together with empirical power equations that are constructed by a polynomial best-fit function together with pump affinity laws based upon a pump curve published by a pump manufacturer; and
      determine corresponding signaling containing information about a pump or system pressure and a flow rate at the motor readout values of power and speed, based upon the signaling received.

2. Apparatus according to claim 1, wherein the signal processor or processing module is configured to resolve pump differential pressures and flow rate at an equilibrium point of the pump or system pressure at a motor steady state condition.

3. Apparatus according to claim 1, wherein the signal processor or processing module is configured to provide the corresponding signaling containing information about the pump or system pressure and the flow rate, including for pump differential pressure and flow monitoring.

4. Apparatus according to claim 3, wherein the corresponding signaling contains information used to control a hydronic pumping system.

5. Apparatus comprising:
   a signal processor or processing module configured at least to:
      receive signaling containing information about motor readout values of power and speed, and also about pump and system characteristics equations together with empirical power equations that are constructed by a polynomial best-fit function together with pump affinity laws based upon a pump curve published by a pump manufacturer; and
      determine corresponding signaling containing information about a pump or system pressure and a flow rate at the motor readout values of power and speed, based upon the signaling received, wherein the signal processor or processing module is configured to:
      resolve the pump or system pressure and the flow rate at a steady state equilibrium point of pump and system pressures which is at an intersection of pump and system curves functions determined,
      determine or represent an instant pump characteristic curve, which is the pump differential pressure P with respect to flow rate Q and motor speed of n, using an approximation in a polynomial form of P=f(Q,n) based upon a pump curve at a motor full speed $n_{max}$ as well as the pump affinity laws, and resolve a system flow rate by using a pump differential pressure function of P=f(Q,n) together with the system flow equation of $C_v = Q/\sqrt{P}$ subsequently.

6. Apparatus according to claim 5, wherein the signal processor or processing module is configured to use the pump affinity laws denoted by the equations for pump flow, differential pressure and motor power, as follows:

$Q/Q_{max} = n/n_{max}$, $P/P_{max} = (n/n_{max})^2$ and, $w/w_{max} = (n/n_{max})^3$, respectively.

7. Apparatus according to claim 6, wherein the signal processor or processing module is configured to derive the system flow rate, using a second order best-fit affinity pump curve function together with a system flow equation as follows:

$$Q(n, C_v) = \frac{n}{2n_{max}}\left(-b \pm \sqrt{b^2 - 4c(a - C_v^{-2})}\right) / (a - C_v^{-2}), \quad (1)$$

where $C_v$ is the system coefficient, and a, b and c are the coefficients of the second order best-fit affinity pump curve function at motor full speed of $n_{max}$.

8. Apparatus according to claim 7, wherein the signal processor or processing module is configured to use a pump differential pressure function of P=f(Q,n) in the form of Equation (2) as follows:

$P(n,Q) = (aQ^2 + b(n/n_{max})^1 Q + (n/n_{max})^2 c)$.

9. Apparatus according to claim 8, wherein the signal processor or processing module is configured to reconstruct a motor power function at maximum speed with respect to the system coefficient by using a fitting or interpolating technique, and formulating the motor power at a given motor speed of $w = w(C_v, n)$, by utilizing the pump affinity law.

10. Apparatus according to claim 9, wherein the signal processor or processing module is configured to use a second order best-fit affinity motor power function and express a system coefficient $C_v$ in form of the Equation as follows:

$$C_v^{norm}(w, n) = -\frac{B}{2A} \pm \sqrt{\frac{w\left(\frac{n_{max}}{n}\right)^3 - \left(C - \frac{B^2}{4A}\right)}{A}},$$

where w is motor power at a speed of n, A, B and C are the coefficients of the second order best-fit affinity motor power function at motor maximum speed with respect to the normalized system coefficient of $C_v^{norm}$.

11. Apparatus according to claim 10, wherein the signal processor or processing module is configured to express the motor power function at any instant speed, $w = w(C_v, n)$, in form of the Equation as follows:

$$w(C_v, n) = \left(\frac{n}{n_{max}}\right)^3 \left(A\left(C_v^{norm} + \frac{B}{2A}\right)^2 + \left(C - \frac{B^2}{4A}\right)\right).$$

12. Apparatus according to claim 10, wherein the signal processor or processing module is configured to use a modified affinity law for motor power and speed representation in the form of the Equation as follows:

$$w(C_v, n) = f^*\left(A\left(C_v^{norm} + \frac{B}{2A}\right)^2 + \left(C - \frac{B^2}{4A}\right)\right),$$

where $f^*(n)$ is the modified affinity law in form of the third order polynomial approximation in the form of the Equation as follows:

$f^*(n) = (A'(n/n_{max})^3 + B'(n/n_{max})^2 + C'(n/n_{max})^1 + D')$, where A', B' C' and D' are the coefficients of the third order best-fit power function of the power values normalized at maximum speed with respect to the normalized motor speed of $n/n_{max}$.

13. A method for pump differential pressure and flow monitoring, comprising:
receiving in a signal processor or processing module signaling containing information about motor readout values of power and speed, and also about pump and system characteristics equations together with empirical power equations that are constructed by a polynomial best-fit function together with pump affinity laws based upon a pump curve published by a pump manufacturer; and
determining in the signal processor or processing module corresponding signaling containing information about a pump or system pressure and a flow rate at the motor readout values of power and speed, based upon the signaling received.

14. A method according to claim 13, wherein the method further comprises resolving in the signal processor or processing module pump differential pressures and flow rate at an equilibrium point of the pump or system pressure at a motor steady state condition.

15. A method according to claim 13, wherein the method further comprises providing from the signal processor or processing module the corresponding signaling containing information about the pump or system pressure and the flow rate, including for pump differential pressure and flow monitoring.

16. A method according to claim 15, wherein the corresponding signaling contains information is used to control a hydronic pumping system.

* * * * *